United States Patent
You et al.

(10) Patent No.: US 12,051,974 B2
(45) Date of Patent: Jul. 30, 2024

(54) METHOD AND APPARATUS FOR REGULATING AN OUTPUT VOLTAGE OF A POWER CONVERTER DURING A LOAD TRANSIENT

(71) Applicant: Infineon Technologies Austria AG, Villach (AT)

(72) Inventors: Zhiqing You, Torrance, CA (US); Tim Ng, Monterey Park, CA (US); Sue Perranoski, Rancho Palos Verdes, CA (US); Benjamim Tang, Rancho Palos Verdes, CA (US)

(73) Assignee: Infineon Technologies Austria AG, Villach (AT)

( * ) Notice: Subject to any disclaimer, the term of this patent is extended or adjusted under 35 U.S.C. 154(b) by 402 days.

(21) Appl. No.: 16/682,830

(22) Filed: Nov. 13, 2019

(65) Prior Publication Data

US 2021/0143735 A1     May 13, 2021

(51) Int. Cl.
*H02M 3/157*     (2006.01)

(52) U.S. Cl.
CPC ................................ *H02M 3/157* (2013.01)

(58) Field of Classification Search
CPC .... H02M 1/082; H02M 1/0845; H02M 3/139; H02M 3/157; H02M 2001/0025
See application file for complete search history.

(56) References Cited

U.S. PATENT DOCUMENTS

| | | | |
|---|---|---|---|
| 8,598,857 B2 | 12/2013 | Pierson et al. | |
| 8,829,872 B1 | 9/2014 | Pierson et al. | |
| 2008/0157742 A1 | 7/2008 | Martin et al. | |
| 2010/0188134 A1* | 7/2010 | Pidutti | H02M 1/32 327/427 |
| 2011/0204988 A1 | 8/2011 | Prodic et al. | |
| 2012/0126761 A1 | 5/2012 | Tuten | |
| 2015/0326120 A1* | 11/2015 | Kelin | H02M 3/158 323/282 |
| 2017/0163144 A1* | 6/2017 | Boncato | H02M 1/32 |
| 2017/0163156 A1 | 6/2017 | Babazadeh et al. | |
| 2019/0302818 A1* | 10/2019 | Liu | H02M 3/156 |

* cited by examiner

*Primary Examiner* — Peter M Novak
(74) *Attorney, Agent, or Firm* — Murphy, Bilak & Homiller, PLLC

(57) ABSTRACT

A controller for a power converter includes: an estimator configured to estimate or calculate a slew rate of an output voltage of the power converter or a slew rate of an error voltage which corresponds to a difference between the output voltage and a target voltage, during a load transient; and a modulator configured to modify regulation of the output voltage based on the estimated or calculated slew rate. A corresponding voltage regulation method and an electronic system that includes the power converter are also described.

10 Claims, 9 Drawing Sheets

METHOD AND APPARATUS FOR REGULATING AN OUTPUT VOLTAGE OF A POWER CONVERTER DURING A LOAD TRANSIENT

BACKGROUND

Power converters are widely used for regulating the supply voltage of an electronic load. Voltage regulation is implemented by tracking the power converter output voltage to a target voltage. During a load transient when the load current changes rapidly, the output voltage deviates from the target voltage. For a positive load current step in which the load current rises rapidly, the error voltage, which corresponds to the difference between the output voltage and the target voltage, may exceed a threshold depending on the magnitude of the load current step. If the threshold is exceeded, some form of non-linear compensation such as activating extra phases is typically implemented to increase the total current delivered to the load. Similarly for a negative load current step in which the load current drops rapidly, the error voltage may fall below a threshold depending on the magnitude of the load current step. In response, one or more phases may be dropped to decrease the total current delivered to the load.

The error voltage, which is used as part of the voltage regulation process, may have delay if the output voltage or target voltage does not settle during a load transient. This may result in the addition of PWM (pulse width modulation) high-side pulses or PWM entering tri-state after the load step or load release, which can cause a voltage undershoot or overshoot condition which exceeds permitted limits.

Some power converter controllers implement voltage regulation at a higher switching frequency such that a smaller output inductance can be used, resulting in smaller overshoot of the output voltage. Higher switching frequency with smaller inductance is less efficient compared to lower switching frequency with higher inductance. However, efficiency is a key parameter in the selection of a power converter. Another solution involves adding more output capacitors which can reduce undershoot or overshoot of the output voltage during load transients. However, more output capacitors increases the overall system cost and requires additional area.

Thus, there is a need for an improved method and apparatus for regulating the output voltage of a power converter during a load transient.

SUMMARY

According to an embodiment of a method of regulating an output voltage of a power converter during a load transient, the method comprises: estimating or calculating a slew rate of the output voltage or a slew rate of an error voltage which corresponds to a difference between the output voltage and a target voltage, during the load transient; and modifying the regulation of the output voltage based on the estimated or calculated slew rate.

According to an embodiment of a controller for a power converter, the controller comprises: an estimator configured to estimate or calculate a slew rate of an output voltage of the power converter or a slew rate of an error voltage which corresponds to a difference between the output voltage and a target voltage, during a load transient; and a modulator configured to modify regulation of the output voltage based on the estimated or calculated slew rate.

According to an embodiment of an electronic system, the electronic system comprises: an electrical load; and a power converter configured to regulate an output voltage provided to the electrical load, the power converter comprising a controller configured to estimate or calculate a slew rate of the output voltage or a slew rate of an error voltage which corresponds to a difference between the output voltage and a target voltage, during a load transient, and to modify regulation of the output voltage based on the estimated or calculated slew rate.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Figure 1:
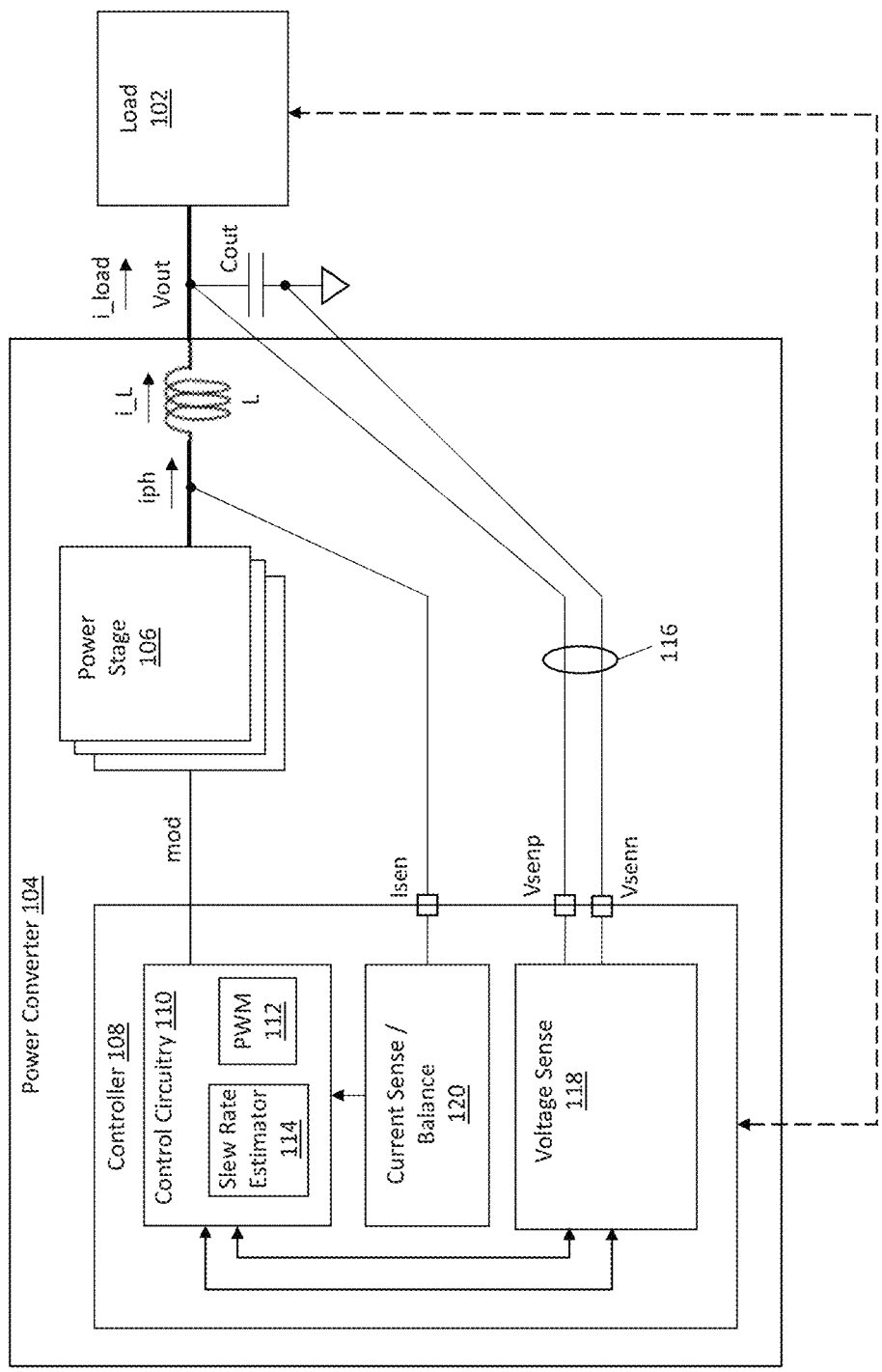
FIG. 1 illustrates a block diagram of an embodiment of an electronic system that includes a load and a power converter configured to regulate an output voltage provided to the load.

The embodiments described describe an apparatus and method for regulating the output voltage of a power converter during a load transient, without requiring additional output capacitors and without having to operate at a higher switching frequency with smaller inductance. The voltage regulation techniques described herein provide for quicker reaction to load transients by estimating or calculating the slew rate of the output voltage or the slew rate of the error voltage during a load transient, and modifying the output voltage regulation based on the estimated or calculated slew rate. The slew rate of the output voltage or the slew rate of the error voltage may be estimated or calculated more quickly compared to waiting for the error voltage to exceed a threshold which indicates corrective action should be taken. By modifying the output voltage regulation based on an estimated or calculated slew rate of the output voltage or error voltage, output voltage overshoot and/or undershoot may be reduced compared to voltage error-based threshold detection schemes, especially when the output voltage or target voltage does not settle during the load transient.

The term "power converter" as used herein broadly refers to any type of power converter or voltage regulator (VR) that provides one or more regulated voltages to one or more electronic loads such as an Ethernet switch, an ASIC (application-specification integrated circuit), a memory device, a processor such as a central processing unit (CPU), microprocessor, graphics processing unit (GPU), digital signal processor (DSP), artificial intelligence (AI) accelerator, image processor, network or packet processor, coprocessor, multi-core processor, front-end processor, baseband processor, etc. For example, the power converter may be a buck converter, a boost converter, a buck-boost converter, a switched capacitor voltage regulator, a step-down converter, etc. The power converter may be implemented as a power device module.

The term "power device module" as used herein means a packaged functional assembly that includes at least one power switch of a power stage used in converting a voltage from one level to another level, e.g., as is done in power conversion and voltage regulation. The power device module may also include a driver circuit for driving the at least one power switch. The power device module may additionally include a controller for controlling the driver circuit so as to implement the power converter. The controller and/or driver functionality may instead be implemented outside the power device module. The driver circuit for the at least one power switch included in the power device module also may be outside the power device module. Various passive components such as capacitors and/or inductors that make up the power converter may be included in the power device module, surface mounted to the power device module, located on a separate board, etc. Described next in more detail are various embodiments of the power converter, method for regulating the output voltage of the power converter during a load transient, and an electronic system that includes the power converter.

FIG. 1 illustrates an embodiment of an electronic system 100 that includes a load 102 and a power converter 104 configured to regulate an output voltage (Vout) provided to the load 102. The load 102 may be any type of electronic load requiring a regulated supply voltage. For example, the load 102 may be an Ethernet switch, an ASIC, a memory device, a processor such as a CPU, microprocessor, GPU, DSP, AI accelerator, image processor, network or packet processor, coprocessor, multi-core processor, front-end processor, baseband processor, etc. The power converter 104 is shown as a buck converter in FIG. 1 merely as an example. In this example, the power converter 104 includes a plurality of power stages 106 each configured to provide a phase current (iph) to the load 102 through a respective inductor (Lout) and an output capacitor (Cout) reduces output voltage ripple.

A controller 108 for the power converter 104 is configured to generate a modulation signal (mod) for controlling the phase current iph of each power stage 106 so as to regulate the output voltage Vout provided to the load 102. The power converter 104 may instead include a single phase/power stage 106. In general, the power converter 104 may be any type of power converter or voltage regulator that provides one or more regulated voltages (Vout) to the load 102. For example, the power converter 104 may be a buck converter as shown in FIG. 1, a boost converter, a buck-boost converter, a switched capacitor voltage regulator, a step-down converter, etc. and may be implemented as a power device module, as previously described herein.

The power converter controller 108 includes control circuitry 110 for implementing regulation of the output voltage Vout. The control circuitry 110 includes a modulator 112 for generating the modulation signal 'mod' for controlling the phase current iph of each power stage 106 so as to regulate the output voltage Vout provided to the load 102. In one embodiment, the modulator 110 implements pulse width modulation (PWM).

The controller 108 also includes a slew rate estimator 114 for estimating or calculating the slew rate of the output voltage Vout or the slew rate of an error voltage (Verr) which corresponds to the difference between the output voltage Vout and a target voltage (Vtgt), during a load transient. The load current (i_load) changes rapidly during load transients. A load transient may be in the form of a positive load current step in which the load current i_load rises rapidly, or a negative load current step in which the load current i_load drops rapidly.

The modulator 112 modifies the regulation of the output voltage Vout based on the slew rate estimated or calculated by the slew rate estimator 114. For example, the case of a positive load current step, the modulator 112 may activate one or more additional phases/power stages 106 to increase the total load current i_load. In the case of a negative load current step, the modulator 112 may drop one or more phases/power stages 106 to decrease the total load current i_load.

The load 102 and the power converter controller 108 may be in direct or indirect communication, as indicated by the corresponding dashed line in FIG. 1. The communication may be one-way from the load 102 to the controller 108, e.g., to provide voltage identification (VID) information related to a voltage target setpoint, or may be two-way so that the controller 108 may also communicate telemetry information such as temperature, current, etc. to the load 102.

The power converter controller 108 also has a first voltage sense terminal Vsenp and a second voltage sense terminal Vsenn for sensing the output voltage Vout of the power converter 104. The voltage sense terminals Vsenp, Vsenn of the controller 108 provide an interface to which corresponding voltage sensing lines 116 are connected. The first voltage sense terminal Vsenp of the controller 108 may be a positive sense terminal and the second voltage sense terminal Vsenn of the controller 108 may be a negative or reference (ground) sense terminal.

While the regulated output voltage Vout is shown as being sensed across the output capacitor Cout, this is for ease of illustration and understanding only. The sensing lines 116 connected to the voltage sense terminals Vsenp, Vsenn of the controller 108 may not necessarily be connected directly to the output capacitor Cout as shown. For example, the voltage sensing lines 116 may be connected at one end to the respective voltage sense terminals Vsenp, Vsenn of the controller 108 and at the opposite end to I/O (input/output) circuitry of one or more of the power stages 106.

In general, the voltage sensing lines 116 connected to the voltage sense terminals Vsenp, Vsenn of the power converter controller 108 carry a voltage which corresponds to the output voltage Vout of the power converter 104, so that a voltage sense circuit 118 included in the controller 108 can directly measure/sense the regulated output voltage Vout at the first and second voltage sense terminals Vsenp, Vsenn of the controller 108. The voltage sense terminals Vsenp, Vsenn of the controller 108 may be physically implemented as pins, connectors, terminal blocks, etc.

The power converter controller 108 may further include a current sense and balance circuit 120 for sensing the phase current (Iph) delivered by each power stage 106 at a corresponding current sense terminal Isen of the controller 108, and converting the sensed current information into phase current information. The current sense and balance circuit 120 also converts the phase current information into adjustments to the duty cycle generated by the modulator 112 for each individual power stage 106, to adjust the phase currents iph so the phase currents iph remain balanced in the case of multi-phase operation.

Figure 2:
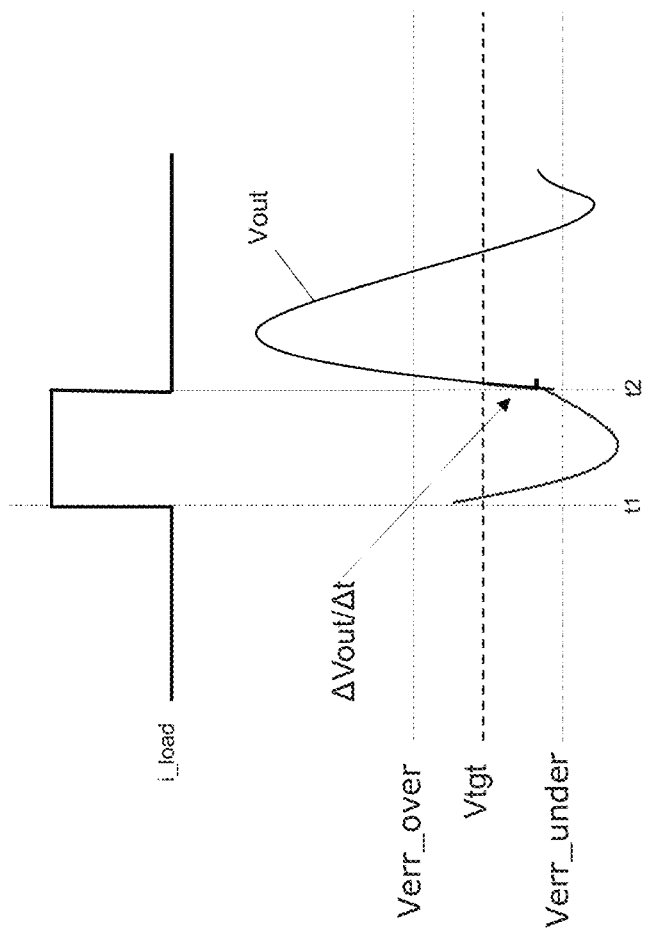
FIG. 2 illustrates an example of a positive load current transient at time t1 in which the load current increases rapidly, followed shortly thereafter by a negative load current transient at time t2 in which the load current decreases rapidly.

FIG. 2 illustrates an example of a positive load current transient at time t1 in which the load current i_load increases rapidly, followed shortly thereafter by a negative load current transient at time t2 in which the load current i_load decreases rapidly. When the transient occurs at time t1, the load current i_load increases and the output voltage Vout drops correspondingly and then recovers. The output voltage Vout jumps back up at the end of the short load transient at time t2. Also plotted in FIG. 2 are an overshot limit (Verr_over), an undershoot limit (Verr_under), and a target voltage (Vtgt) against which the output voltage Vout of the power converter is regulated.

The error voltage (Verr) may be calculated as Verr=Vout−Vtgt. An undershoot condition occurs when the error voltage Verr drops below the undershoot limit Verr_under. An overshoot condition occurs when the error voltage Verr exceeds the overshoot limit Verr_over. The slew rate of the output voltage Vout is $\Delta Vout/\Delta t$. If the output voltage Vout and/or the target voltage Vtgt is not settled by the end of the short load transient at time t2, modifying the regulation of the output voltage Vout based on the slew rate of Vout is faster than conventional Verr-based threshold detection. Verr-based threshold detection involves modifying the output voltage regulation in response to the error voltage Verr passing either the overshot limit Verr_over (overshoot condition) or the undershoot limit Verr_under (undershoot condition).

In contrast, the slew rate of the output voltage Vout changes near instantaneously at the start of a load transient (e.g. times t1 or t2 in FIG. 2), thus permitting the modulator 112 to modify the output voltage regulation much more quickly as compared to conventional Verr-based threshold detection. The slew rate of the error voltage Verr instead may be used to determine when to modify the regulation of the output voltage Vout.

By using either Vout or Verr slew rate detection instead of conventional Verr-based threshold detection, the controller 108 is able to modify the regulation of the output voltage Vout more quickly, resulting in less Vout overshoot for negative load current steps and less undershoot for positive load current steps. This is readily apparent in FIG. 2. By examining the slope of the Vout (or instead Verr) curve, the slew rate estimator 114 more quickly determines when a load transient occurred and does not need to wait for the error voltage Verr to surpass the upper or lower limit Verr_over, Verr_under before triggering action by the modulator 112.

For example, the modulator 112 may assert additional PWM pulses and/or add additional phases/power stages 106 much more quickly in response to a positive load current transient to lessen Vout undershoot, or may blank PWM high-side pulses or let the PWM enter tri-state much more quickly in response to a negative load current transient to lessen Vout overshoot. In general, the slew rate estimator 114 estimates or calculates the slew rate of the output voltage Vout or the slew rate of the error voltage Verr to determine when the modulator 112 should modify the regulation of the output voltage Vout.

FIG. 2 shows a zero load line scenario. In general, the upper and lower load line boundaries (Verr_over, Verr_under) set the allowable range of the output voltage Vout that should be provided to the load 102, e.g., in the case of a processor as the load 102. The output voltage Vout should not exceed these load line boundaries under non-transient load conditions to ensure proper operation of the load 102. In the case of a 'zero' load line, this means that the load line (Vtgt) has zero slope and therefore does not change as a function of load current i_load. Otherwise, the target voltage Vtgt changes as a function of load current i_load. The load line may be linear or non-linear.

Figure 3:
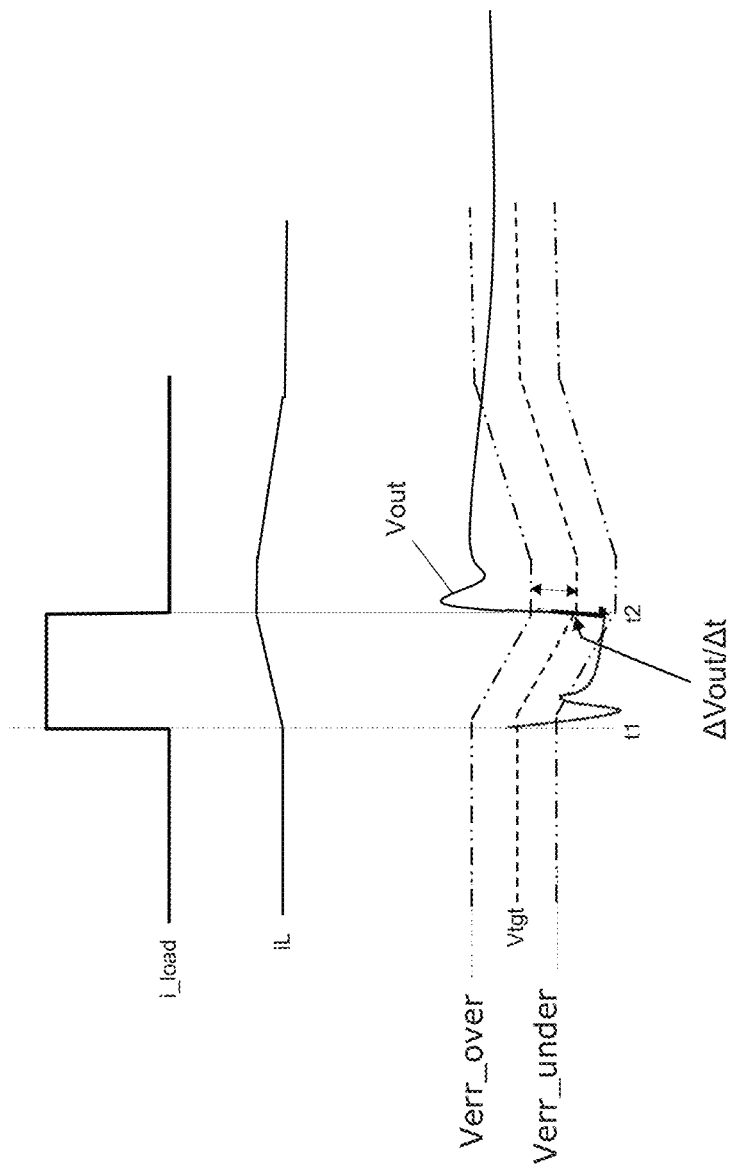
FIG. 3 illustrates the same example as FIG. 2, but for a non-zero load line.

FIG. 3 illustrates the same example as FIG. 2, but for a non-zero load line (Vtgt). According to this embodiment, the target voltage Vtgt changes as a function of load current i_load. For example, the target voltage Vtgt may be a function of sensed inductor current iL. The error thresholds Verr_over, Verr_under move correspondingly. As with the example in FIG. 2, modifying the regulation of the output voltage Vout based on the slew rate of Vout or based on the slew rate of Verr is faster than conventional Verr-based threshold detection, especially if the output voltage Vout and/or target voltage Vgt is not settled by the end of the short load transient at time t2. Accordingly, the slew rate estimator 114 more quickly determines when the load transient at time t2 occurred and does not need to wait for the error voltage Verr to surpass the upper limit Verr_over before triggering action by the modulator 112.

Figure 4:
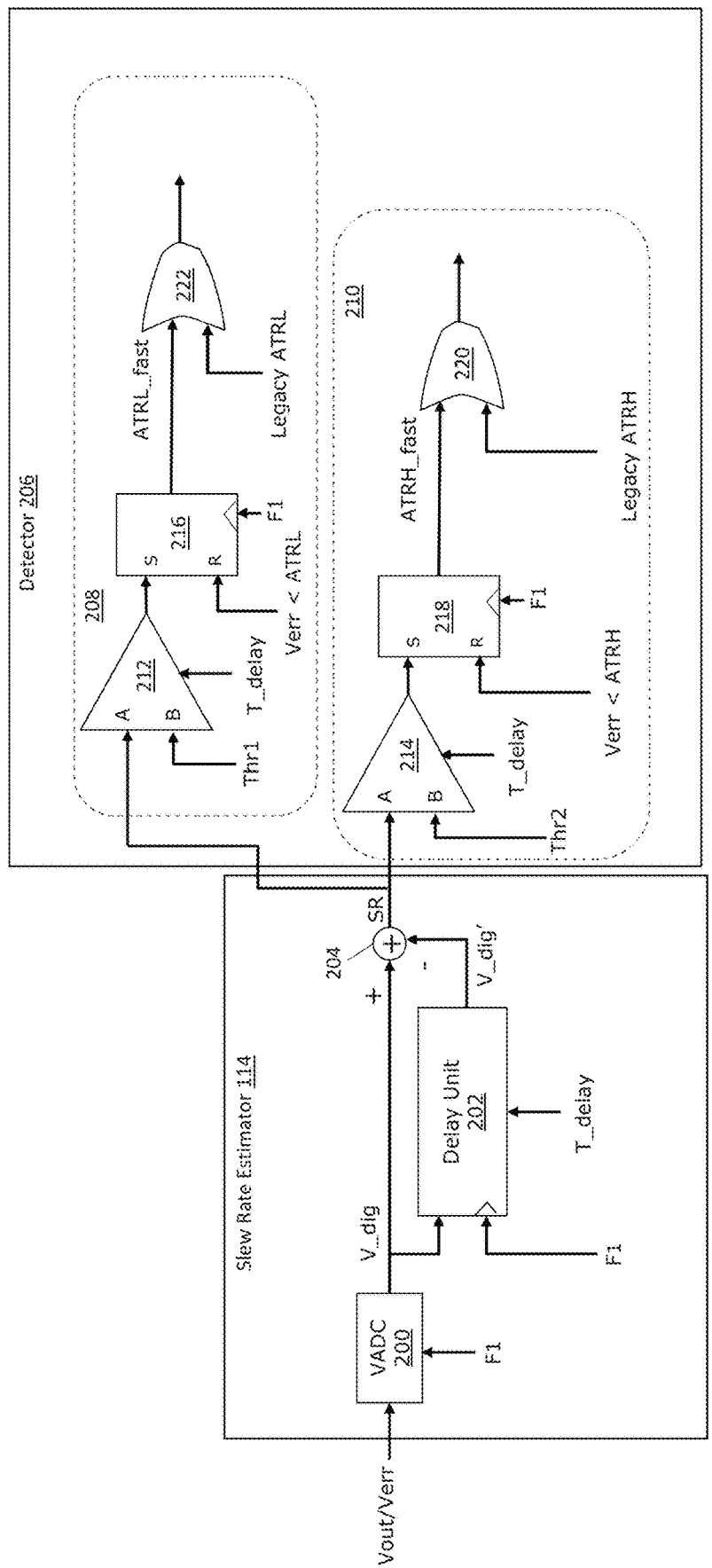
FIG. 4 illustrates a block diagram of an embodiment of a slew rate estimator included in a power regulator controller for estimating or calculating the slew rate of the output voltage or the slew rate of an error voltage during a load transient.

FIG. 4 illustrates an embodiment of the slew rate estimator 114 included in the power regulator controller 108 for estimating or calculating the slew rate of the output voltage Vout or the slew rate of the error voltage Verr during a load transient. According to this embodiment, the slew rate estimator 114 includes an analog-to-digital converter (ADC) 200 configured to digitize an analog measurement of the output voltage Vout at frequency F1. The ADC 200 may or may not be part of the controller voltage sense circuit 118.

The slew rate estimator 114 also includes a delay unit 202 configured to delay the digitized measurement of the output voltage V_dig by an amount T_delay at frequency F1. The amount of delay T_delay, which may be programmable or fixed, determines how much time, i.e., window size is provided for comparison.

The slew rate estimator 114 further includes a subtractor or adder 204 configured to subtract or add, respectively, the delayed digitized measurement V_dig' of the output voltage Vout and the digitized measurement V_dig of the output voltage Vout to yield a slew rate value SR. The adder/subtractor 204 estimates or measures the amount of change ($\Delta V$) in the output voltage Vout by adding or subtracting V_dig' from V_dig which may be used to estimate or calculate the slew rate value SR since Δt is known, where Δt corresponds to the amount of delay T_delay implemented by the delay unit 202 and therefore defines the size of the comparison window. The slew rate value SR may instead be based on the error voltage Verr.

Figure 5:
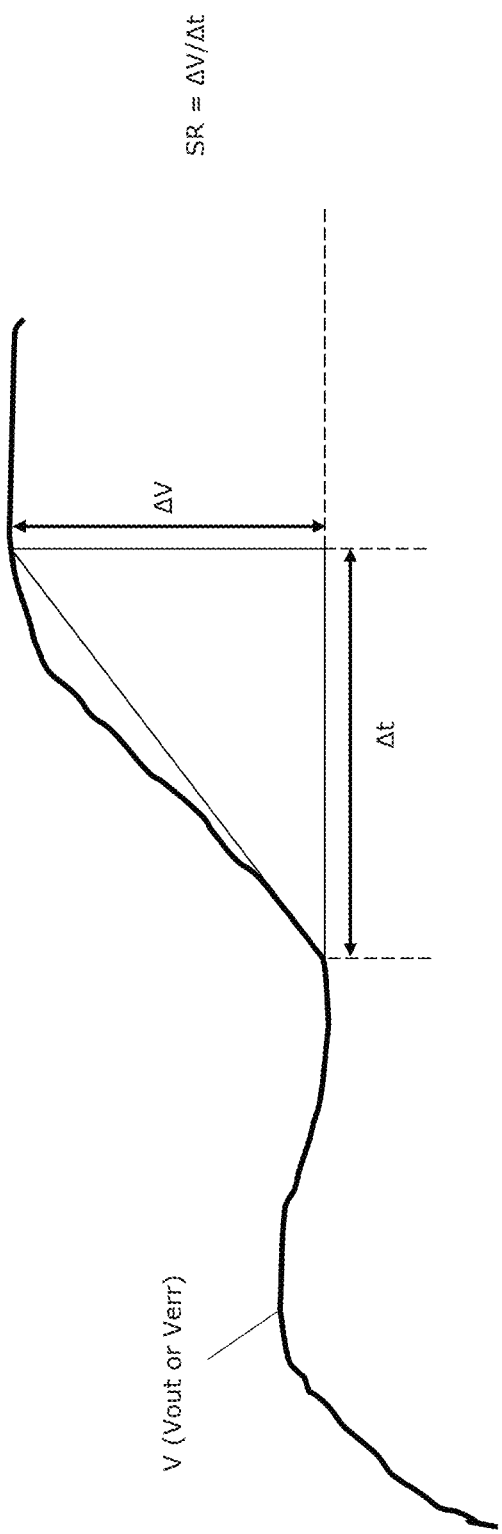
FIG. 5 illustrates a waveform diagram example of one comparison window over which the slew rate of the output voltage or the slew rate of the error voltage is estimated or calculated by the slew rate estimator.

FIG. 5 illustrates an example of one comparison window over which the slew rate of the output voltage Vout or the slew rate of the error voltage Verr is estimated or calculated by the slew rate estimator 114. In the case of a wider time window (larger Δt) for comparison, the voltage difference (ΔV) should be larger and therefore the change in slope (slew rate=ΔV/Δt) should be detected more accurately but with greater delay because Δt is larger. In the case of a narrower time widow (smaller Δt) for comparison, the slew rate detection is more susceptible to Vout variation which can lead to a false trip but introduces less delay. The comparison window may be chosen to be small enough to avoid unnecessary delay, but not too small so as to incur false trips. In one embodiment, the amount of delay T_delay and hence the window size (Δt) implemented by the slew rate estimator 114 is based on system noise characteristics. The slew rate estimator 114 may perform the comparison window periodically, where the periodicity of the comparison window corresponds to the amount of time (T_delay) by which the digitized measurement V_dig of the output voltage Vout or the error voltage Verr is delayed. Again, the delay T_delay may be programmable or fixed.

Figure 6B:
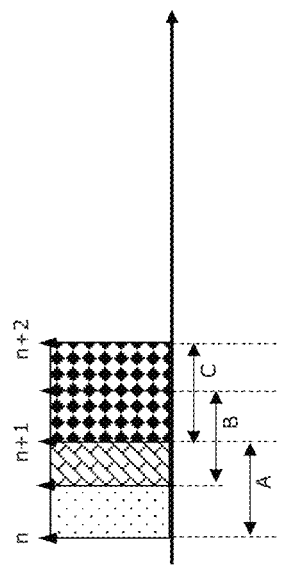
FIG. 6B illustrates the same three slew rate detection windows as in FIG. 6A, but implemented by the slew rate estimator with overlap.
Figure 6A:
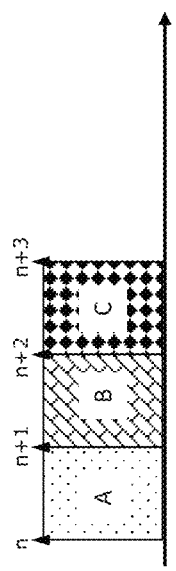
FIG. 6A illustrates three slew rate detection windows implemented by the slew rate estimator and which occur successively with no overlap.

FIG. 6A shows the case where three slew rate detection windows A, B, C occur successively with no overlap. As explained above, if the slew rate detection windows A, B, C are too wide (large Δt), even though still detected early, there can be some jitter on the detection time which causes the timing to vary based on window size, causing the slew rate value SR to have jitter (deviation).

FIG. 6B illustrates the same three slew rate detection windows A, B, C as in FIG. 6A, but with overlap. That is, the next successive slew rate detection window in the series begins before the immediately preceding one ends. According to this embodiment, for each slew rate detection window A, B, C in the series of overlapping windows, the ADC 200 digitizes the analog measurement of the output voltage Vout or error voltage Verr at the start of each window A, B, C. The delay unit 202 delays the digitized voltage measurement V_dig to define the end of each window A, B.C. The adder/subtractor 204 subtracts or adds the delayed digitized voltage measurement V_dig' to the digitized voltage measurement V_dig to yield a slew rate value SR at the end of each window A, B, C.

For each window in the series of overlapping slew rate detection windows A, B, C, the detector 206 of the slew rate estimator 114 compares the slew rate value SR at the end of each window A, B, C to at least one threshold Thr1 (e.g. overshoot) and/or Thr2 (e.g. undershoot) and sets a corresponding latch 216, 218 responsive to the slew rate value SR at the end of any of the windows A, B, C exceeding the respective threshold Thr1, Thr2. As explained above, the detector 206 indicates that the regulation of the output voltage Vout is to be modified if the output of one of the latches 216, 218 is set.

According to the embodiment illustrated in FIG. 6B, the slew rate detection windows A, B, C overlap with finer steps (smaller intervals) as compared to the non-overlapping steps n, n+1, n+2, n+3 in FIG. 6A. Accordingly, the slew rate estimator 114 does not have to wait for the window in which a load transient occurred to end before taking corrective action. Instead, multiple slew rate detection windows are pipelined in an overlapping manner, effectively reducing the window size for taking corrective action in response to a load transient. As a result, less change in Vout or Verr occurs from the point of load transient detection to the time for taking corrective action, thereby reducing jitter.

The overlapping window approach shown in FIG. 6B may be implemented for the just the first threshold detection circuit 208 for early detection of overshoot conditions, for just the second threshold detection circuit 210 for early detection of just undershoot conditions, or for both the first threshold detection circuit 208 and the second threshold detection circuit 210 for early detection of both overshoot and undershoot conditions. The overlapping window approach may be implemented by replicating the delay unit 202 and the adder/subtractor 204 of the slew rate estimator 114 to yield overlapping instances of slew rate estimates/calculations.

Figure 6C:
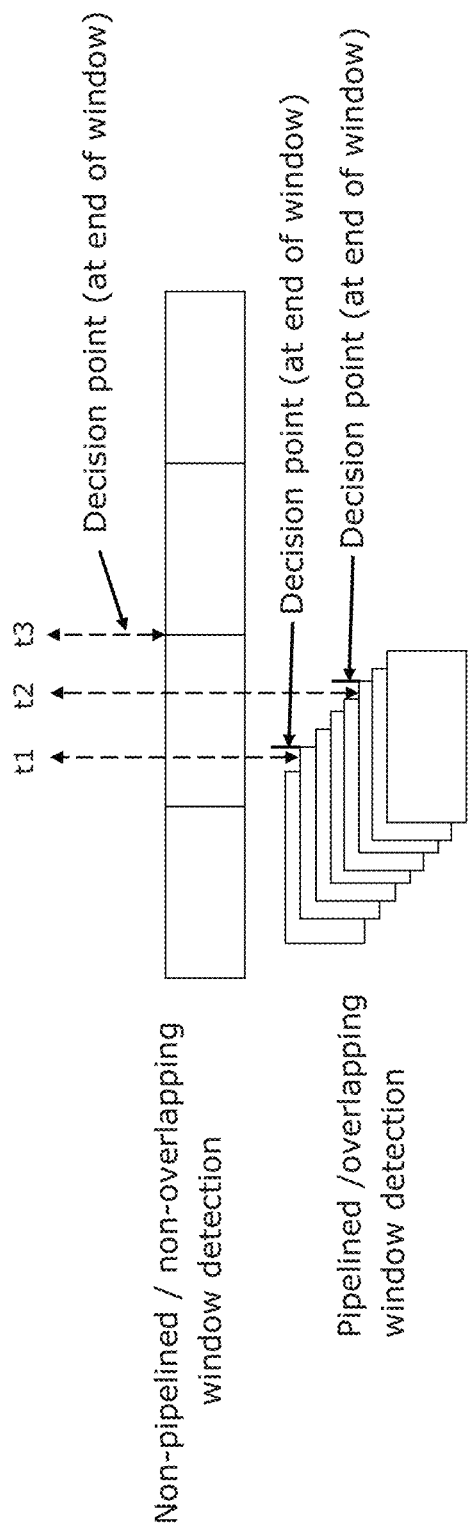
FIG. 6C is a schematic diagram comparing the non-pipelined/non-overlapping window approach illustrated in FIG. 6A to the pipelined/overlapping window approach illustrated in FIG. 6B.

FIG. 6C compares the non-pipelined/non-overlapping window approach illustrated in FIG. 6A to the pipelined/overlapping window approach illustrated in FIG. 6B. Two load transients are shown. The first load transient occurs at time t1 and the second load transient occurs at time t2. With the non-pipelined/non-overlapping window approach illustrated in FIG. 6A, neither load transient is detected until the end of the second slew rate detection window which occurs at time t3 since that is when the ΔV value for the second slew rate detection window is calculated. This results in a delay of t3−t1 for taking corrective action in response to the first load transient, and a delay of t3−t2 for taking corrective action in response to the second load transient.

The decision points whether or not to modify the voltage regulation are finer/shorter with the pipelined/overlapping window approach illustrated in FIG. 6B even though the slew rate detection windows are the same size as in the non-pipelined/non-overlapping window approach, because the windows overlap and therefore provide decision points with less temporal spacing. With the pipelined/overlapping window approach illustrated in FIG. 6B, both load transients are detected earlier than in the case of the non-pipelined/non-overlapping window approach illustrated in FIG. 6A, since the corresponding ΔV values are available significantly earlier due to the slew rate detection window overlap. This results in significantly less delay for taking corrective action in the case of either load transient.

A detector 206 may be included in or associated with the slew rate estimator 114 as shown in FIG. 4, for determining whether the estimated or calculated slew rate value SR exceeds an overshoot threshold and/or an undershoot threshold. The modulator 112 modifies the regulation of the output voltage Vout responsive to the estimated or calculated slew rate SR exceeding either threshold. According to this embodiment, latch reset is used to signal that the voltage regulation should be modified, and the latch reset is based on a threshold comparison. Ideally, detection of a load transient does not subside until the error voltage Verr is small enough since the Vout or Verr slope and hence slew rate can abate quickly but the error voltage Verr may still be present. Accordingly, an error voltage threshold comparison where Verr=Vout−Vtgt may be used but to determine when to reset a latch. The threshold may be variable and depend, e.g., on the error voltage Verr. The threshold instead may be fixed. In either case, the detector 206 may perform the threshold comparison for just positive load current steps (undershoot), just negative load current steps (overshoot), or for both positive and negative load current steps (undershoot and overshoot).

For example, the detector 206 may include a first threshold detection circuit 208 for determining when the slew rate value SR exceeds a first threshold (undershoot) and/or a second threshold detection circuit 210 for determining when the slew rate value SR drops below a second threshold (overshoot). Each threshold detection circuit 208, 210 includes a respective comparator 212, 214 configured to compare the slew rate value SR to the corresponding threshold Thr1, Thr2, and a respective latch 216, 218 such as an SR (set-reset) latch configured to set responsive to the slew rate value SR exceeding the corresponding threshold Thr1, Thr2. The output (ATRL_fast, ATRH_fast) of the corresponding latch 216, 218 indicates whether that latch 216, 218 is set and the regulation of the output voltage Vout is to be modified. Each latch 216, 218 resets based on the error voltage Verr, responsive to the target voltage Vtgt returning to a predetermined range where the corresponding latch output ATRL_fast, ATRH_fast indicates the latch 216, 218 is reset.

In more detail, the first threshold detection circuit 208 includes a first comparator 212 for comparing the slew rate value SR to a first threshold Thr1 and a first latch 216 configured to set responsive to the slew rate value SR dropping below the first threshold Thr1 (undershoot condition/negative slew rate slope). The second threshold detection circuit 210 similarly includes a second comparator 214 for comparing the slew rate value SR to a second threshold Thr2 and a second latch 218 configured to set responsive to the slew rate value SR exceeding the second threshold Thr2 (overshoot condition/positive slew rate slope). In one embodiment, the modulator 112 adds one or more additional PWM pulses used in the regulation of the output voltage Vout responsive to the output ATRL_fast of the first latch 216 indicating the first latch 216 is set. The modulator 112 blanks one or more PWM pulses or tri-states the PWM used in the regulation of the output voltage Vout responsive to the output ATRH_fast of the second latch 218 indicating the second latch 218 is set.

The second threshold detection circuit 210 may also include a logic OR gate or similar logic 220 for modifying the regulation of Vout responsive to either the output ATRH_fast of the second latch 218 indicating the second latch 218 is set or responsive to a legacy overshoot signal ('Legacy ATRH') which may be generated by a conventional Verr-based threshold detection method. The first threshold detection circuit 208 may similarly include a logic OR gate or similar logic 222 for modifying the regulation of Vout responsive to either the output ATRL_fast of the first latch 216 indicating the first latch 216 is set or responsive to a legacy undershoot signal ('Legacy ATRL') which may be generated by a conventional Verr-based threshold detection method.

Figure 7:
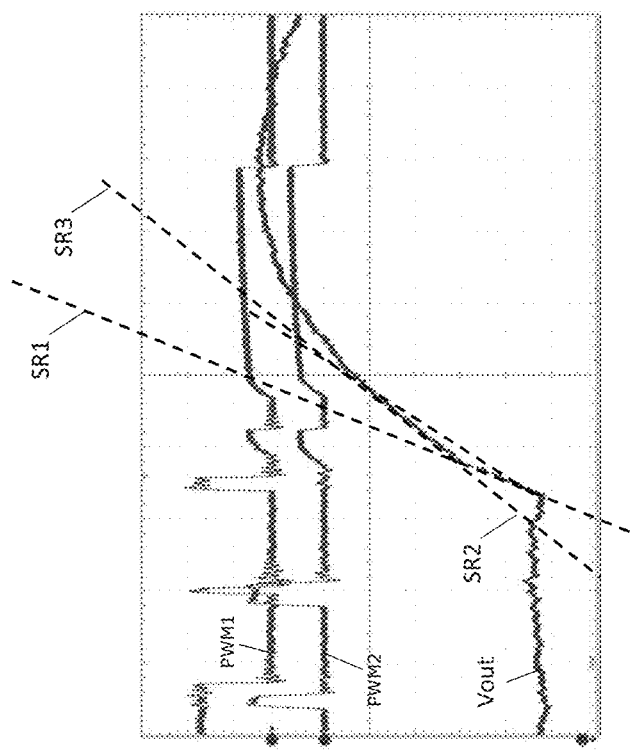
FIG. 7 illustrates a waveform diagram in which jitter may occur in the output voltage due to flattening of the slope of the slew rate estimated or calculated by the slew rate estimator.

FIG. 7 illustrates a scenario in which jitter may occur in the output voltage Vout due to flattening of the slope of the slew rate estimated or calculated by the slew rate estimator 114. The output voltage Vout and PWM control signals PWM1, PWM2 for high-side and low-side power switches, respectively, of a power stage 106 of the power converter 104 are plotted around the time of a negative load current step transient in which the load current i_load drops rapidly and the output voltage Vout rises in response. In response to such a load transient, the modulator 112 may drop one or more phases/power stages 106 to decrease the total load current i_load. As described herein, the slew rate estimator 114 determines when the modulator 114 should take corrective action based on the slew rate of the output voltage Vout or the slew rate of the error voltage during the load transient.

The Vout transient waveform may change slowly due to the output capacitance and rise time of the load current i_load. This results in an RC type of response when the load current i_load stops rising. This means that the slope of the output voltage Vout begins to flatten even though the load transient event has not fully subsided, which may cause the voltage regulation modification flag (ATRH_fast in this case) to go away. This results in the output voltage waveform having different slopes/slew rates (SR1, SR2, SR3) depending on when the slew rate value SR is estimated/calculated by the slew rate estimator 114.

To mitigate this effect, hysteresis may be added based on whether the corresponding latch 216, 218 of the detector 206 set or not to override the reset operation. For the respective latch 216, 218 to reset, the slew rate value SR estimated/calculated by the slew rate estimator 114 must be below the corresponding threshold Thr1, Thr2 according to this embodiment. Because the load transient may be detected so fast using the slew rate-based detection techniques described herein, the estimated/calculated slew rate value SR may not have exceeded the corresponding threshold Thr1, Thr2 before the slope decreases. The corresponding voltage regulation modification flag (ATRH_fast or ATRL_fast) goes away because the slew rate value SR is below the corresponding threshold Thr1, Th2, thereby avoiding a glitch. If latched, a flatter slope is desired to maintain the corrective action being implemented by the modulator 112. Different delay and slope thresholds, with hysteresis, may be used to mitigate this issue. Even though the Vout slope is decreased, the power converter 104 may still have an overshoot or undershoot issue and therefore the corrective action being implemented by the modulator 112 should be allowed to continue. Adding hysteresis allows this to happen.

Figure 8:
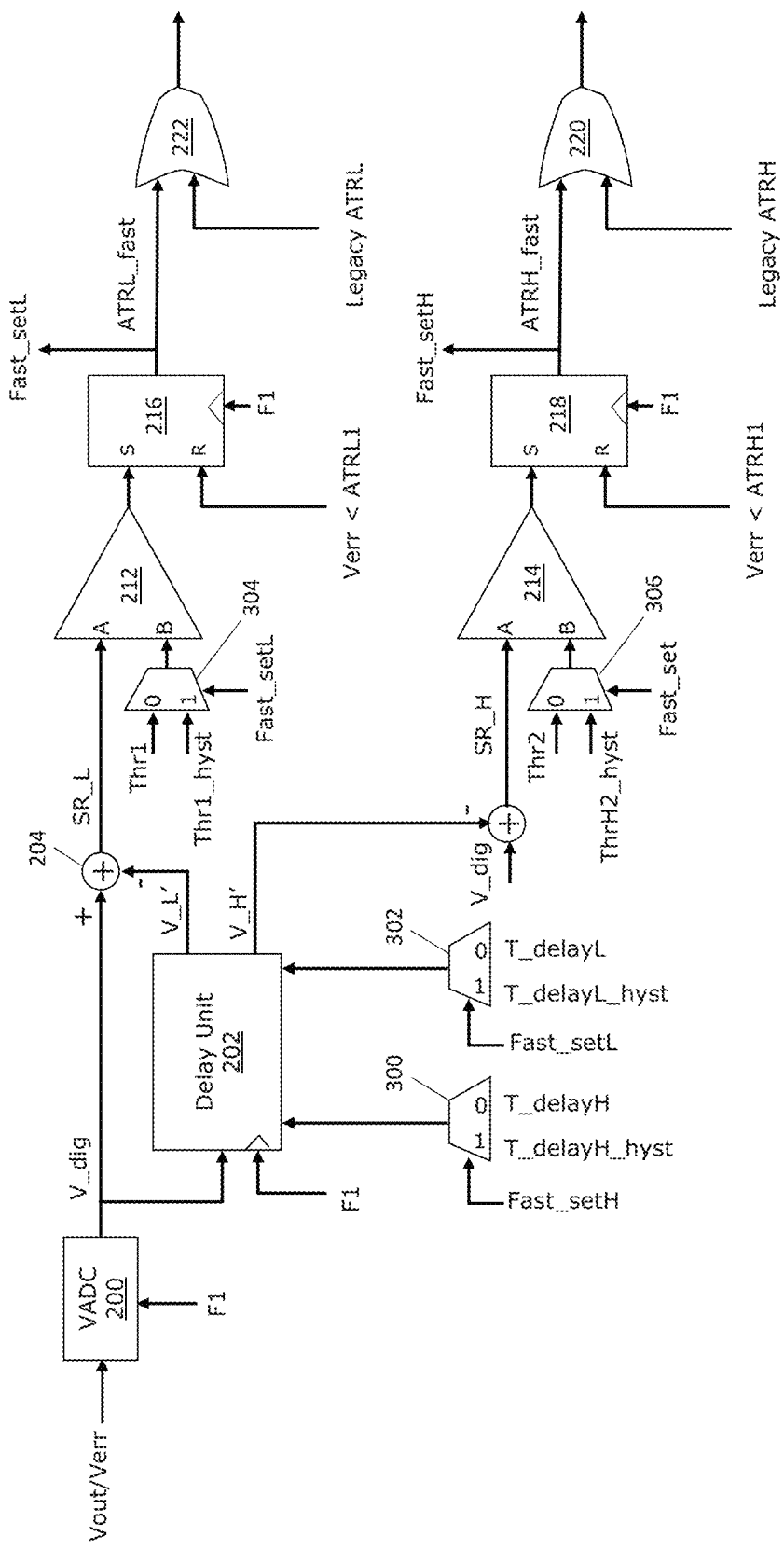
FIG. 8 illustrates a block diagram of another embodiment of a slew rate estimator included in a power regulator controller for estimating or calculating the slew rate of the output voltage or the slew rate of an error voltage during a load transient.

FIG. 8 illustrates another embodiment of the slew rate estimator 114 included in the power regulator controller 108 for estimating or calculating the slew rate of the output voltage Vout or the slew rate of the error voltage Verr during a load transient. The embodiment shown in FIG. 8 is similar to the embodiment illustrated in FIG. 4. Different, however, if the slew rate value SR exceeds a threshold, at least one of the delay implemented by the delay unit 202 and the thresholds Thr1, Th2 implemented by the respective threshold detection circuits 208 are increased.

The delay unit 202 outputs a first delayed digitized measurement V_L' for use in detecting undershoot conditions caused by load transients with a positive load current step, and a second delayed digitized measurement V_H' for use in detecting overshoot conditions caused by load transients with a negative load current step. A first multiplexor of similar circuit 300 selects a smaller delay (T_delayH) for generating the first delayed digitized measurement V_L' if the corresponding slew rate value SR_L is below a related threshold as indicated by the signal Fast_setL and selects a larger delay (T_delayH_hyst) for generating the first delayed digitized measurement V_L' if the slew rate value SR_L exceeds the related threshold. Similarly, a second multiplexor of similar circuit 302 selects a smaller delay (T_delayL) for generating the second delayed digitized measurement V_H' if the corresponding slew rate value SR_H is below a related threshold as indicated by the signal Fast_setH and selects a larger delay (T_delayL_hyst) for generating the second delayed digitized measurement V_H' if the slew rate value SR_H exceeds the related threshold.

In addition or separately, the detector 206 may also introduce hysteresis to mitigate against slope flattening. In one embodiment, the detector 206 includes a third multiplexor of similar circuit 304 which selects a smaller threshold (Thr1) for comparing against the first slew rate value SR_L generated by the slew rate estimator 114 if the slew rate value SR_L is below the related threshold as indicated by the signal Fast_setL and selects a larger threshold (Thr1_hyst) for comparing against the first slew rate value S_L if the slew rate value SR_L exceeds the related threshold. The detector 206 also includes a fourth multiplexor of similar circuit 306 which selects a smaller threshold (Thr2) for comparing against the second slew rate value SR_H generated by the slew rate estimator 114 if the slew rate value SR_H is below the related threshold as indicated by the signal Fast_setH and selects a larger threshold (Thr2_hyst) for comparing against the second slew rate value S_H if the slew rate value SR_H exceeds the related threshold. The thresholds Thr1, Thr1_hyst, Thr2, Thr2_hyst input to the latches 216, 28 of the detector 206 may be programmable or fixed, as previously described herein.

The term 'ATR' as used herein refers to active transient response which is a form of non-linear control implemented by the power converter controller 108. 'ATRL' refers to active transient response for undershoot conditions and 'ATRH' refers to active transient response for overshoot conditions.

The power converter controller 108 may include a PID (proportional-integral-derivative) controller for implementing linear control, and an ATR circuit for implementing non-linear control. The ATR circuit included in the power converter controller 108 may detect the voltage and/or current level at the load 102 and/or the slew rate of the output voltage, and provide a corresponding signal to the modulator 112, e.g., according to the magnitude of a deviation of the load voltage or slew rate of the load voltage from the target voltage. For example, the ATR circuit included in the power converter controller 108 may compare the load voltage or slew rate of the load voltage to one or more thresholds. In the event that the transient voltage at the load 102 or the corresponding slew rate deviates from the target voltage by one or more of the pre-set thresholds, the ATR circuit may provide a signal to the modulator 112 that is a function of the amplitude of the deviation of the detected voltage from the target voltage. For example, the ATR output may be one of 'ATRL_fast', 'ATRH_fast', 'Legacy ATRL', or 'Legacy ATRH' as previously described herein in connection with FIGS. 4 and 8.

In addition or separately, the ATR circuit included in the power converter controller 108 may provide such ATR event signals to an AVP (adaptive voltage positioning) circuit of the controller 108 for providing an early, predictive change which can occur prior to the time that the sensed current change is received from an ADC of the current sense and balance circuit 120 because the sensed load current change is delayed passing through the output inductors L.

As long as the voltage at the load 102 is maintained within predetermined limits, the ATR circuit included in the power converter controller 108 is not activated and none of the corresponding signals 'ATRL_fast', 'ATRH_fast', 'Legacy ATRL', and 'Legacy ATRH' are activated. However, when changes in power demands by the load 102 result in a voltage excursion at the load 102 that exceeds the predetermined limits, the ATR implemented by the power converter controller 108 provides the corresponding signal 'ATRL_fast', 'ATRH_fast', 'Legacy ATRL', or 'Legacy ATRH' to the modulator 112 to correct the voltage deviation rapidly and with minimal noise generation. Accordingly, the power converter controller 108 may identify a transient event in the output signal corresponding to load voltage excursions and/or slew rate of the load voltage Vout at the load 102, or identify a transient event in the output signal corresponding to voltage excursions and/or slew rate of the error voltage Verr at the load 102.

The power converter controller 108 may automatically and/or autonomously adapt the operating mode to maximize efficiency as the load current changes. For example, the controller 108 may control the number of phases/power stages 106 providing power to the load 102. In particular, the controller 108 may optimize the power efficiency of the power converter 104 by increasing and/or decreasing the number of active phases/power stages 106.

The power converter controller 108 may implement adaptive phase/power stage 106 drop/add, as well as adaptive non-overlap timing, to optimize efficiency, such as over the entire range of load current for the relevant applications. Further, the controller 108 may vary the non-overlap delay between the turn-off of a synchronous FET and the turn-on of a control FET for each phase/power stage 106 setting to further optimize efficiency. In addition, the ATR implemented by the power converter controller 108 may implement a multi-level sensing technique to detect not only that a voltage excursion requires an active transient response, but may also detect the amplitude of the excursion. As the transient amplitude passes multiple thresholds, for example in the negative direction, all the previously disabled phases/power stages 106 may be activated at once.

Although the present disclosure is not so limited, the following numbered examples demonstrate one or more aspects of the disclosure.

Example 1

A method of regulating an output voltage of a power converter during a load transient, the method comprising: estimating or calculating a slew rate of the output voltage or a slew rate of an error voltage which corresponds to a difference between the output voltage and a target voltage, during the load transient; and modifying the regulation of the output voltage based on the estimated or calculated slew rate.

Example 2

The method of example 1, wherein modifying the regulation of the output voltage based on the estimated or calculated slew rate comprises modifying the regulation of the output voltage responsive to the estimated or calculated slew rate exceeding a threshold.

Example 3

The method of example 2, wherein the threshold is variable and depends on the error voltage.

Example 4

The method of any of examples 1 through 3, wherein estimating or calculating the slew rate of the output voltage or the slew rate of the error voltage comprises: digitizing an analog measurement of the output voltage; delaying the digitized measurement of the output voltage; and subtracting or adding the delayed digitized measurement of the output voltage and the digitized measurement of the output voltage to yield a slew rate value.

Example 5

The method of example 4, wherein modifying the regulation of the output voltage based on the estimated or calculated slew rate comprises: comparing the slew rate value to a threshold; and setting a latch responsive to the slew rate value exceeding the threshold, wherein an output of the latch indicates the latch is set and the regulation of the output voltage is to be modified.

Example 6

The method of example 5, wherein the comparison is performed periodically, and wherein a periodicity of the comparison corresponds to an amount by which the digitized measurement of the output voltage is delayed.

Example 7

The method of example 6, wherein the delay is programmable.

Example 8

The method of any of examples 5 through 7, further comprising: resetting the latch based on the error voltage and responsive to the target voltage returning to a predetermined range, wherein the output of the latch indicates the latch is reset.

Example 9

The method of any of examples 4 and 6 through 8, wherein modifying the regulation of the output voltage based on the estimated or calculated slew rate comprises: comparing the slew rate value to a first threshold; setting a first latch responsive to the slew rate value being greater than the first threshold; blanking one or more PWM (pulse width modulation) pulses or tri-stating the PWM used in the regulation of the output voltage, responsive to an output of the first latch indicating the first latch is set; comparing the slew rate value to a second threshold; setting a second latch responsive to the slew rate value being less than the second threshold; and adding one or more additional PWM pulses used in the regulation of the output voltage, responsive to an output of the second latch indicating the second latch is set.

Example 10

The method of any of examples 4 through 9, further comprising: for each window in a series of overlapping windows, digitizing the analog measurement of the output voltage at a start of the window, delaying the digitized measurement of the output voltage to define an end of the window, and subtracting or adding the delayed digitized measurement of the output voltage and the digitized measurement of the output voltage to yield a slew rate value at the end of the window.

Example 11

The method of example 10, wherein modifying the regulation of the output voltage based on the estimated or calculated slew rate comprises: for each window in the series of overlapping windows, comparing the slew rate value at the end of the window to a threshold; and setting a latch responsive to the slew rate value at the end of any of the windows exceeding the threshold, wherein an output of the latch indicates the latch is set and the regulation of the output voltage is to be modified.

Example 12

The method of any of examples 4 through 11, further comprising: if the slew rate value exceeds a threshold, increasing at least one of the delay and the threshold.

Example 13

The method of any of examples 1 through 12, further comprising: identifying a transient event in a signal corresponding to load voltage excursions and/or the slew rate of the output voltage; or identifying a transient event in a signal corresponding to voltage excursions and/or the slew rate of the error voltage.

Example 14

A controller for a power converter, the controller comprising: an estimator configured to estimate or calculate a slew rate of an output voltage of the power converter or a slew rate of an error voltage which corresponds to a difference between the output voltage and a target voltage, during a load transient; and a modulator configured to modify regulation of the output voltage based on the estimated or calculated slew rate.

Example 15

The controller of example 14, further comprising: a detector configured to determine if the estimated or calculated slew rate exceeds a threshold, wherein the modulator is configured to modify the regulation of the output voltage responsive to the estimated or calculated slew rate exceeding the threshold.

Example 16

The controller of example 15, wherein the threshold is variable and depends on the error voltage.

Example 17

The controller of examples 15 or 16, wherein the estimator comprises: an analog-to-digital converter configured to digitize an analog measurement of the output voltage; a delay unit configured to delay the digitized measurement of the output voltage; and a subtractor or adder configured to subtract or add, respectively, the delayed digitized measurement of the output voltage and the digitized measurement of the output voltage to yield a slew rate value.

Example 18

The controller of example 17, wherein the detector comprises: a comparator configured to compare the slew rate value to the threshold; and a latch configured to set responsive to the slew rate value exceeding the threshold, wherein an output of the latch indicates the latch is set and the regulation of the output voltage is to be modified.

Example 19

The controller of example 18, wherein the latch is further configured to reset based on the error voltage, responsive to the target voltage returning to a predetermined range, and wherein the output of the latch indicates the latch is reset.

Example 20

The controller of any of examples 15 and 17 through 19, wherein the detector comprises: a first comparator configured to compare the slew rate value to a first threshold; a first latch configured to set responsive to the slew rate value being greater than the first threshold; a second comparator configured to compare the slew rate value to a second threshold; and a second latch configured to set responsive to the slew rate value being less than the second threshold, wherein the modulator is configured to blank one or more PWM (pulse width modulation) pulses or tri-stating the PWM used in the regulation of the output voltage, responsive to an output of the first latch indicating the first latch is set, wherein the modulator is configured to add one or more additional PWM pulses used in the regulation of the output voltage, responsive to an output of the second latch indicating the second latch is set.

Example 21

The controller of example 17, wherein for each window in a series of overlapping windows, the estimator is configured to digitize the analog measurement of the output voltage at a start of the window, delay the digitized measurement of the output voltage to define an end of the window, and subtract or add the delayed digitized measurement of the output voltage and the digitized measurement of the output voltage to yield a slew rate value at the end of the window.

Example 22

The controller of example 21, wherein for each window in the series of overlapping windows, the detector is configured to compare the slew rate value at the end of the window to the threshold and a set a latch responsive to the slew rate value at the end of any of the windows exceeding the threshold, an output of the latch indicating the latch is set and the regulation of the output voltage is to be modified.

Example 23

The controller of example 17, wherein if the slew rate value exceeds a threshold, the estimator is configured to increase the delay and/or the detector is configured to increase the threshold.

Example 24

The controller of any of examples 14 through 23, further comprising control circuitry configured to identify a transient event in a signal corresponding to load voltage excursions and/or the slew rate of the output voltage, or to identify a transient event in a signal corresponding to voltage excursions and/or the slew rate of the error voltage.

Example 25

An electronic system, comprising: an electrical load; and a power converter configured to regulate an output voltage provided to the electrical load, the power converter comprising a controller configured to estimate or calculate a slew rate of the output voltage or a slew rate of an error voltage which corresponds to a difference between the output voltage and a target voltage, during a load transient, and to modify regulation of the output voltage based on the estimated or calculated slew rate.

Example 26

The electronic system of example 25, wherein the controller of the power converter comprises an estimator configured to estimate or calculate the slew rate of the output voltage or the slew rate of the error voltage, during the load transient, a detector configured to determine if the estimated or calculated slew rate exceeds a threshold, and a modulator configured to modify regulation of the output voltage responsive to the estimated or calculated slew rate exceeding the threshold.

Example 27

The electronic system of examples 25 or 26, wherein the controller of the power converter is configured to identify a transient event in a signal corresponding to voltage excursions at the electrical load and/or the slew rate of the output voltage, or to identify a transient event in a signal corresponding to voltage excursions and/or the slew rate of the error voltage.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of regulating an output voltage of a power converter during a load transient, the method comprising: estimating or calculating a slew rate of the output voltage or a slew rate of an error voltage which corresponds to a difference between the output voltage and a target voltage, during the load transient; and regulating the output voltage, with respect to the target voltage, throughout the load transient, wherein regulating the output voltage throughout the load transient comprises modifying said regulating, during the load transient, based on the estimated or calculated slew rate, wherein modifying said regulating, during the load transient, based on the estimated or calculated slew rate, comprises adjusting the regulation of the output voltage responsive to the estimated or calculated slew rate exceeding a threshold, wherein the threshold is variable and depends on the error voltage.

2. A method of regulating an output voltage of a power converter during a load transient, the method comprising: estimating or calculating a slew rate of the output voltage or a slew rate of an error voltage which corresponds to a difference between the output voltage and a target voltage, during the load transient; and regulating the output voltage, with respect to the target voltage, throughout the load transient, wherein regulating the output voltage throughout the load transient comprises modifying said regulating, during the load transient, based on the estimated or calculated slew rate, wherein estimating or calculating the slew rate of the output voltage or the slew rate of the error voltage comprises: digitizing an analog measurement of the output voltage; delaying the digitized measurement of the output voltage; and subtracting or adding the delayed digitized measurement of the output voltage and the wherein modifying said regulating, during the load transient, based on the estimated or calculated slew rate, comprises: comparing the slew rate value to a threshold; and setting a latch responsive to the slew rate value exceeding the threshold, wherein an output of the latch indicates the latch is set and the regulation of the output voltage is to be modified.

3. A method of regulating an output voltage of a power converter during a load transient, the method comprising: estimating or calculating a slew rate of the output voltage or a slew rate of an error voltage which corresponds to a difference between the output voltage and a target voltage, during the load transient; and regulating the output voltage, with respect to the target voltage, throughout the load transient, wherein regulating the output voltage throughout the load transient comprises modifying said regulating, during the load transient, based on the estimated or calculated slew rate, wherein estimating or calculating the slew rate of the output voltage or the slew rate of the error voltage comprises: digitizing an analog measurement of the output voltage; delaying the digitized measurement of the output voltage; and subtracting or adding the delayed digitized measurement of the output voltage and the wherein modifying said regulating, during the load transient, based on the estimated or calculated slew rate, comprises: comparing the slew rate value to a threshold; and setting a latch responsive to the slew rate value exceeding the threshold, wherein an output of the latch indicates the latch is set and the regulation of the output voltage is to be modified further comprising: resetting the latch based on the error voltage and responsive to the target voltage returning to a predetermined range, wherein the output of the latch indicates the latch is reset.

4. A method of regulating an output voltage of a power converter during a load transient, the method comprising: estimating or calculating a slew rate of the output voltage or a slew rate of an error voltage which corresponds to a difference between the output voltage and a target voltage, during the load transient; and regulating the output voltage, with respect to the target voltage, throughout the load transient, wherein regulating the output voltage throughout the load transient comprises modifying said regulating, during the load transient, based on the estimated or calculated slew rate wherein modifying said regulating, during the load transient, based on the estimated or calculated slew rate, comprises: comparing the slew rate value to a threshold; and setting a latch responsive to the slew rate value exceeding the threshold, wherein an output of the latch indicates the latch is set and the regulation of the output voltage is to be modified further comprising: for each window in a series of overlapping windows, digitizing the analog measurement of the output voltage at a start of the window, delaying the digitized measurement of the output voltage to define an end of the window, and subtracting or adding the delayed digitized measurement of the output voltage and the digitized measurement of the output voltage to yield a slew rate value at the end of the window wherein modifying said regulating, during the load transient, based on the estimated or calculated slew rate, comprises: for each window in the series of overlapping windows, comparing the slew rate value at the end of the window to a threshold; and setting a latch responsive to the slew rate value at the end of any of the windows exceeding the threshold, wherein an output of the latch indicates the latch is set and the regulation of the output voltage is to be modified.

5. A method of regulating an output voltage of a power converter during a load transient, the method comprising: estimating or calculating a slew rate of the output voltage or a slew rate of an error voltage which corresponds to a difference between the output voltage and a target voltage, during the load transient; and regulating the output voltage, with respect to the target voltage, throughout the load transient, wherein regulating the output voltage throughout the load transient comprises modifying said regulating, during the load transient, based on the estimated or calculated slew rate wherein modifying said regulating, during the load transient, based on the estimated or calculated slew rate, comprises: comparing the slew rate value to a threshold; and setting a latch responsive to the slew rate value exceeding the threshold, wherein an output of the latch indicates the latch is set and the regulation of the output voltage is to be modified further comprising: for each window in a series of overlapping windows, digitizing the analog measurement of the output voltage at a start of the window, delaying the digitized measurement of the output voltage to define an end of the window, and subtracting or adding the delayed digitized measurement of the output voltage and the digitized measurement of the output voltage to yield a slew rate value if the slew rate value exceeds a threshold, increasing at least one of the delay and the threshold.

6. A controller for a power converter, the controller comprising: an estimator configured to estimate or calculate a slew rate of an output voltage of the power converter or a slew rate of an error voltage which corresponds to a difference between the output voltage and a target voltage, during a load transient; and a modulator configured to regulate the output voltage, with respect to the target voltage, throughout the load transient, wherein regulating the output voltage throughout the load transient comprises modifying said regulating, during the load transient, based on the estimated or calculated slew rate further comprising: a detector configured to determine if the estimated or calculated slew rate exceeds a threshold, wherein the modulator is configured to adjust the regulation of the output voltage with respect to the target voltage, during the load transient, responsive to the estimated or calculated slew rate exceeding the threshold, wherein the threshold is variable and depends on the error voltage.

7. A controller for a power converter, the controller comprising: an estimator configured to estimate or calculate a slew rate of an output voltage of the power converter or a slew rate of an error voltage which corresponds to a difference between the output voltage and a target voltage, during a load transient; and a modulator configured to regulate the output voltage, with respect to the target voltage, throughout the load transient, wherein regulating the output voltage throughout the load transient comprises modifying said regulating, during the load transient, based on the estimated or calculated slew rate wherein the estimator comprises: an analog-to-digital converter configured to digitize an analog measurement of the output voltage; a delay unit configured to delay the digitized measurement of the output voltage; and a subtractor or adder configured to subtract or add, respectively, the delayed digitized measurement of the output voltage and the digitized measurement of the output voltage to yield a slew rate value, wherein the detector comprises: a comparator configured to compare the slew rate value to a threshold; and a latch configured to set responsive to the slew rate value exceeding the threshold, wherein an output of the latch indicates the latch is set and the regulation of the output voltage is to be modified.

8. A controller for a power converter, the controller comprising: an estimator configured to estimate or calculate a slew rate of an output voltage of the power converter or a slew rate of an error voltage which corresponds to a difference between the output voltage and a target voltage, during a load transient; and a modulator configured to regulate the output voltage, with respect to the target voltage, throughout the load transient, wherein regulating the output voltage throughout the load transient comprises modifying said regulating, during the load transient, based on the estimated or calculated slew rate wherein the estimator comprises: an analog-to-digital converter configured to digitize an analog measurement of the output voltage; a delay unit configured to delay the digitized measurement of the output voltage; and a subtractor or adder configured to subtract or add, respectively, the delayed digitized measurement of the output voltage and the digitized measurement of the output voltage to yield a slew rate value, wherein the detector comprises: a comparator configured to compare the slew rate value to a threshold; and a latch configured to set responsive to the slew rate value exceeding the threshold, wherein an output of the latch indicates the latch is set and the regulation of the output voltage is to be modified wherein the latch is further configured to reset based on the error voltage, responsive to the target voltage returning to a predetermined range, and wherein the output of the latch indicates the latch is reset.

9. A controller for a power converter, the controller comprising: an estimator configured to estimate or calculate a slew rate of an output voltage of the power converter or a slew rate of an error voltage which corresponds to a difference between the output voltage and a target voltage, during a load transient; and a modulator configured to regulate the output voltage, with respect to the target voltage, throughout the load transient, wherein regulating the output voltage throughout the load transient comprises modifying said regulating, during the load transient, based on the estimated or calculated slew rate wherein the estimator comprises: an analog-to-digital converter configured to digitize an analog measurement of the output voltage; a delay unit configured to delay the digitized measurement of the output voltage; and a subtractor or adder configured to subtract or add, respectively, the delayed digitized measurement of the output voltage and the digitized measurement of the output voltage to yield a slew rate value wherein for each window in a series of overlapping windows, the estimator is configured to digitize the analog measurement of the output voltage at a start of the window, delay the digitized measurement of the output voltage to define an end of the window, and subtract or add the delayed digitized measurement of the output voltage and the digitized measurement of the output voltage to yield a slew rate value at the end of the window, wherein for each window in the series of overlapping windows, the detector is configured to compare the slew rate value at the end of the window to the threshold and a set a latch responsive to the slew rate value at the end of any of the windows exceeding the threshold, an output of the latch indicating the latch is set and the regulation of the output voltage is to be modified.

10. A controller for a power converter, the controller comprising: an estimator configured to estimate or calculate a slew rate of an output voltage of the power converter or a slew rate of an error voltage which corresponds to a difference between the output voltage and a target voltage, during a load transient; and a modulator configured to regulate the output voltage, with respect to the target voltage, throughout the load transient, wherein regulating the output voltage throughout the load transient comprises modifying said regulating, during the load transient, based on the estimated or calculated slew rate wherein the estimator comprises: an analog-to-digital converter configured to digitize an analog measurement of the output voltage; a delay unit configured to delay the digitized measurement of the output voltage; and a subtractor or adder configured to subtract or add, respectively, the delayed digitized measurement of the output voltage and the digitized measurement of the output voltage to yield a slew rate value wherein if the slew rate value exceeds a threshold, the estimator is configured to increase the delay and/or the detector is configured to increase the threshold.

* * * * *

UNITED STATES PATENT AND TRADEMARK OFFICE
CERTIFICATE OF CORRECTION

PATENT NO. : 12,051,974 B2
APPLICATION NO. : 16/682830
DATED : July 30, 2024
INVENTOR(S) : Z. You et al.

It is certified that error appears in the above-identified patent and that said Letters Patent is hereby corrected as shown below:

In the Claims

Column 20, Line 22 (Claim 9, Line 29) please change "a set a" to -- set a --

Signed and Sealed this
Fifteenth Day of October, 2024

Katherine Kelly Vidal
*Director of the United States Patent and Trademark Office*